(12) United States Patent
Foster et al.

(10) Patent No.: US 7,028,106 B2
(45) Date of Patent: Apr. 11, 2006

(54) REMAPPING ROUTING INFORMATION ENTRIES IN AN EXPANDER

(75) Inventors: Joseph E. Foster, Houston, TX (US); Robert C. Elliott, Houston, TX (US); Hubert E. Brinkmann, Jr., Spring, TX (US); James R. Reif, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 248 days.

(21) Appl. No.: 10/728,480

(22) Filed: Dec. 5, 2003

(65) Prior Publication Data

US 2005/0125574 A1    Jun. 9, 2005

(51) Int. Cl.
*G06F 13/00* (2006.01)

(52) U.S. Cl. .............. 710/2; 710/300; 710/36; 710/62; 711/2; 711/200; 709/242; 370/392; 370/401; 370/395.31

(58) Field of Classification Search .......... 710/2–3, 710/36–38, 62–63, 72–74, 100, 104, 300, 710/306, 316–317; 711/2, 200; 709/238, 709/242–244; 370/389–394, 401, 395
See application file for complete search history.

(56) References Cited

U.S. PATENT DOCUMENTS

| | | | | |
|---|---|---|---|---|
| 4,527,251 A | * | 7/1985 | Nibby et al. | 714/8 |
| 5,715,419 A | * | 2/1998 | Szczepanek et al. | 711/212 |
| 5,721,931 A | * | 2/1998 | Gephardt et al. | 710/260 |
| 5,956,743 A | * | 9/1999 | Bruce et al. | 711/103 |
| 6,052,773 A | * | 4/2000 | DeHon et al. | 712/43 |
| 6,215,748 B1 | * | 4/2001 | Greenwood et al. | 369/53.31 |
| 6,229,788 B1 | * | 5/2001 | Graves et al. | 370/230 |
| 6,594,718 B1 | * | 7/2003 | Ebner et al. | 710/240 |
| 6,769,046 B1 | * | 7/2004 | Adams et al. | 710/316 |
| 2001/0043602 A1 | * | 11/2001 | Brown | 370/392 |
| 2005/0066100 A1 | * | 3/2005 | Elliott et al. | 710/300 |
| 2005/0117529 A1 | * | 6/2005 | Ramos-Escano et al. | 370/282 |
| 2005/0138261 A1 | * | 6/2005 | Marushak et al. | 710/316 |

OTHER PUBLICATIONS

Robert C. Elliot, Working Draft American National Standard, T10/1562-D, "Information Technology-Serial Attached SCSI (SAS)," pp. 1-432 Rev. 5 (Jul. 9, 2003).

Robert C. Elliot, Working Draft American National Standard, T10-1601-D, "Information Technology-Serial Attached SCSI -1.1 (SAS-1.1)," pp. 1-435 Rev. 1 (Sep. 18, 2003).

U.S. Appl. No. 10/669,388, entitled "System Having Storage Subsystems and a Link Coupling the Storage Subsystems," filed Sep. 24, 2003, by Robert C. Elliot et al.

* cited by examiner

*Primary Examiner*—Christopher Shin (57) ABSTRACT

A system includes a peripheral device and an expander having interfaces to couple to one or more peripheral devices and an expander. The expander has a storage to store entries containing routing information used to route a request received by the expander to one of the interfaces, wherein each interface is allocated to a respective set of routing information entries. Mapping logic remaps unused routing information of one of the interfaces to one or more other interfaces to expand capacity of the one or more other interfaces.

38 Claims, 6 Drawing Sheets

REMAPPING ROUTING INFORMATION ENTRIES IN AN EXPANDER

BACKGROUND

In certain applications, such as in a network environment, relatively large amounts of data may have to be stored in storage subsystems of computer systems. In a network environment, many users store data and programs on one or more computer servers, which usually include or are attached to one or more storage subsystems of relatively large capacity. A computer server storage subsystem can be made up of a large number of storage devices, including hard disk drives, tape drives, compact disc (CD) drives, digital versatile disc (DVD) drives, and so forth.

A popular interface for coupling storage devices (and other peripheral devices) to a computer system is the small computer system interface (SCSI). A SCSI interface is traditionally a parallel interface (having multiple signals) to provide increased bandwidth in communications between a computer and a peripheral device. However, parallel interfaces may not be able to offer reliable performance at very high operating frequencies.

To address issues associated with traditional SCSI interfaces, a Serial Attached SCSI (SAS) Standard has been proposed. The SAS Standard defines the rules for exchanging information between SCSI devices using a serial interconnect. The SAS Standard also defines the rules for exchanging information between AT attached (ATA) host and ATA devices using the same serial interconnect. ATA is a standard for the internal attachment of storage devices to hosts. One version of the SAS Standard is defined by Working Draft American National Standard, "Information Technology-Serial Attached SCSI (SAS)," Revision 5, dated Jul. 9, 2003.

One feature of a SAS system is that multiple SAS domains can be defined, with each domain having a tree of interconnected devices that include one or more expanders. An expander increases the number of interfaces available to couple to peripheral devices (such as storage devices) within a given SAS domain. Expanders can be coupled to other expanders to further expand the capacity to attach to additional peripheral devices. Usually, each SAS domain (or SAS expander tree) is associated with one or more initiators. An initiator responds to commands from software in a computer system for accessing storage devices in a domain to retrieve data or to write data.

Each expander includes phys that are each coupled to an initiator, another expander, or a target device. A phy is a type of interface that communicates with another phy over a link. Phys are associated with route tables that contain routing information used to route an access request through phys of an expander such that the access request can reach the intended target device. The route table entries for certain types of phys are not utilized and thus are disabled. However, because the current version of the SAS Standard implements static route table binding, such unused route table entries are not available for use by other phys. As a result, the number of devices that a SAS expander can support is limited.

SUMMARY

In general, according to one embodiment, a system includes a first expander having plural interfaces to couple to at least one of a peripheral device, a controller, and another expander. The first expander has a storage to store entries containing routing information used to route a request received by the first expander to one of the interfaces, wherein each interface is allocated a respective set of the routing information entries. The system also includes mapping logic operable to remap unused routing information entries allocated to one of the interfaces to one or more other interfaces to expand capacity of the one or more other interfaces.

Other or alternative features will become apparent from the following description, from the drawings, and from the claims.

DETAILED DESCRIPTION

Figure 1A:
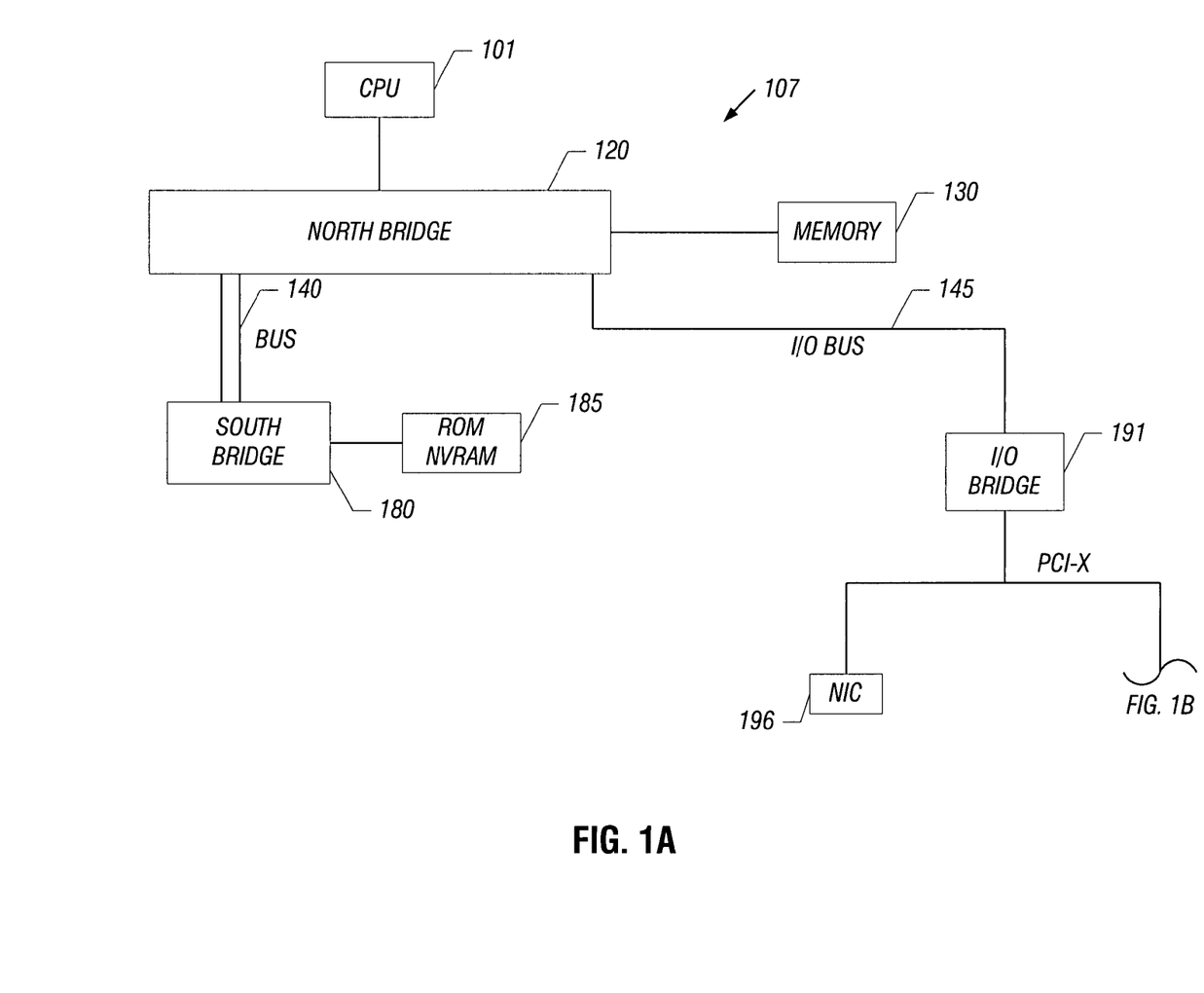
FIGS. 1A–1B are a block diagram of an example computer system incorporating an embodiment of the invention that includes Serial Attached Small Computer System Interface (SAS) storage devices.
Figures 1A, 1B:
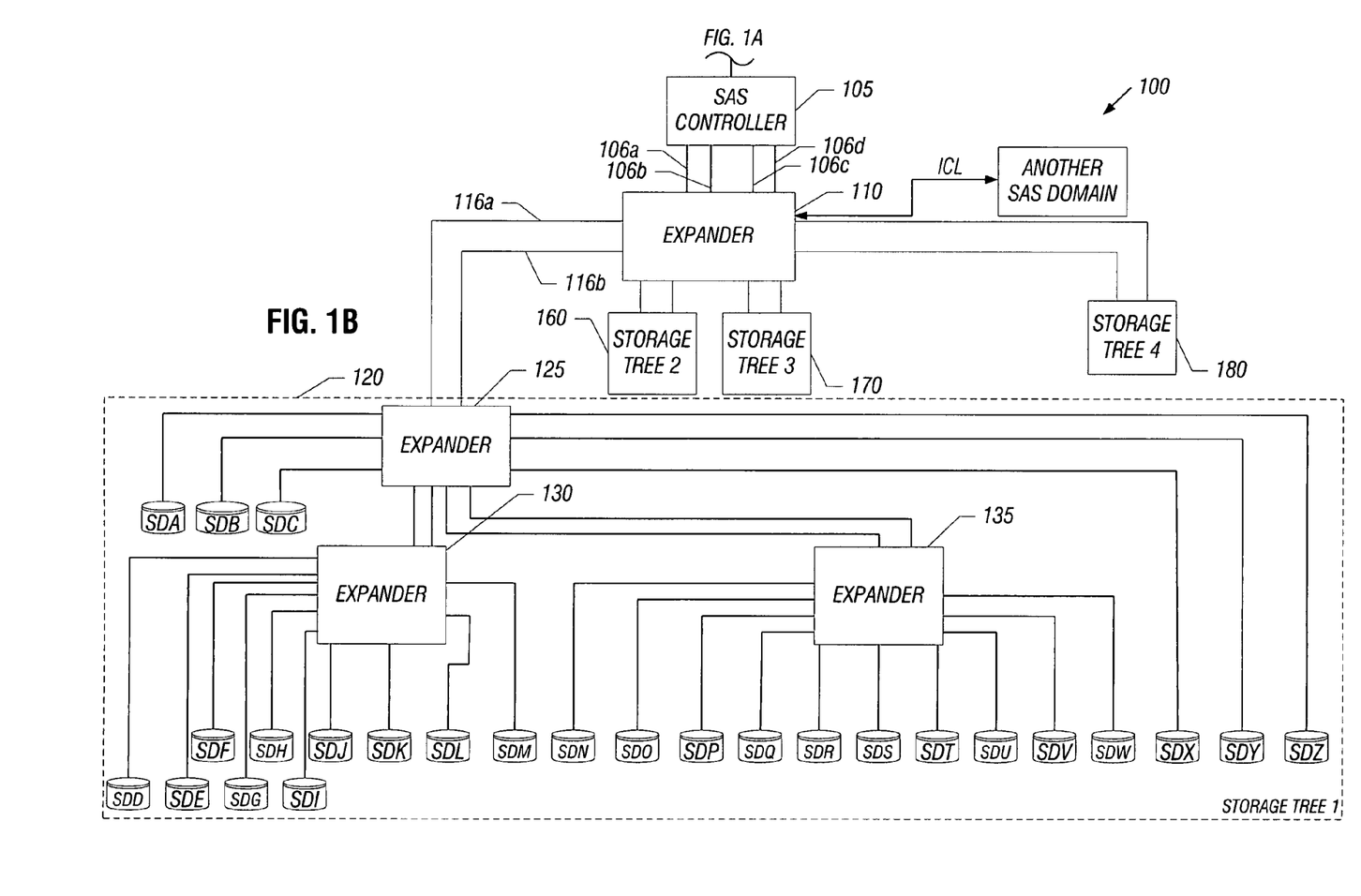

Referring to FIGS. 1A–1B, a computer system 107 according to one example arrangement includes a central processing unit (CPU) 101, memory 130, and a bridge device such as north bridge 120. The north bridge 120 may be coupled through a bus 140 to another bridge device such as south bridge 180. South bridge 180 may be coupled to various devices, including a non-volatile memory 185.

Additionally, the north bridge 120 may be coupled to an input/output (I/O) bridge 191 through an I/O bus 145. The I/O bridge 191 is in turn coupled to several peripheral devices, such as a network interface card (NIC) 196, and a SAS (Serial Attached Small Computer System Interface) controller 105 (FIG. 1B).

The SAS controller 105 is part of a SAS I/O subsystem (identified by numeral 100 in FIG. 1B). The SAS I/O subsystem 100 has an architecture that conforms with the SAS Standard, with one version described in Working Draft American National Standard, "Information Technology-Serial Attached SCSI (SAS)," Revision 5, dated Jul. 9, 2003. The SAS Standard defines the rules to enable the exchange of information between SCSI (small computer system interface) devices over a serial interconnect. SCSI devices include storage devices such as hard disk drives, compact disc (CD) drives, digital versatile disc (DVD) drives, and other mass storage devices. In other embodiments, SCSI devices can also include other types of peripheral devices.

Read or write operations to storage devices in the SAS I/O subsystem 100 may be generated by the CPU 101. In response to such read or write requests, the SAS controller 105 initiates read or write operations to the storage devices in one or more of first storage tree 120, second storage tree 160, third storage tree 170, and fourth storage tree 180 using SAS physical interconnections and messaging defined by the SAS Standard. In other arrangements, additional SAS controller(s) can also be present in the system.

In one embodiment, the SAS controller 105 is implemented as an application-specific integrated circuit (ASIC) that includes firmware. In other embodiments, the SCSI controller 105 can be implemented with other types of devices, such as processors, microcontrollers, and so forth. The SAS controller 105 is coupled to an expander 110 through links 106a–106d, according to one example. An expander is an input/output control device such as a switch that receives information packets at a port from a source and routes the information packets through a selected one of plural other ports to the correct destination.

Each end of a link 106 couples to an interface within each of the SAS controller 105 and expander 110. In one embodiment, such an interface includes a physical device referred to as a "phy" (PHYsical device) as defined by the SAS Standard. A phy includes a transceiver to electrically communicate over the link 106 with a transceiver in another phy. According to SAS, each link is full duplex, such that information can be transferred simultaneously in both directions over the link. Each link 106 is a receive differential pair and a transmit differential pair.

In the example arrangement shown, the expander 110 is coupled over links to devices in multiple storage trees 120, 160, 170, and 180. The links between the expander 110 and the storage tree 120 are labeled 116a and 116b. The storage tree 120 includes three additional expanders 125, 130, and 135. The expander 125 is connected to the expander 110, storage devices (SD) SDA, SDB, SDC, SDX, SDY, and SDZ, expander 130, and expander 135. At the lowest level of the storage tree 120, expander 130 and expander 135 are each further connected to multiple storage devices. Each of expanders 110, 125, 130 and 135 includes a routing controller (described in greater detail below) that allows information received by one port to be transmitted to an expander or storage device through another port in the expander.

Figure 2:
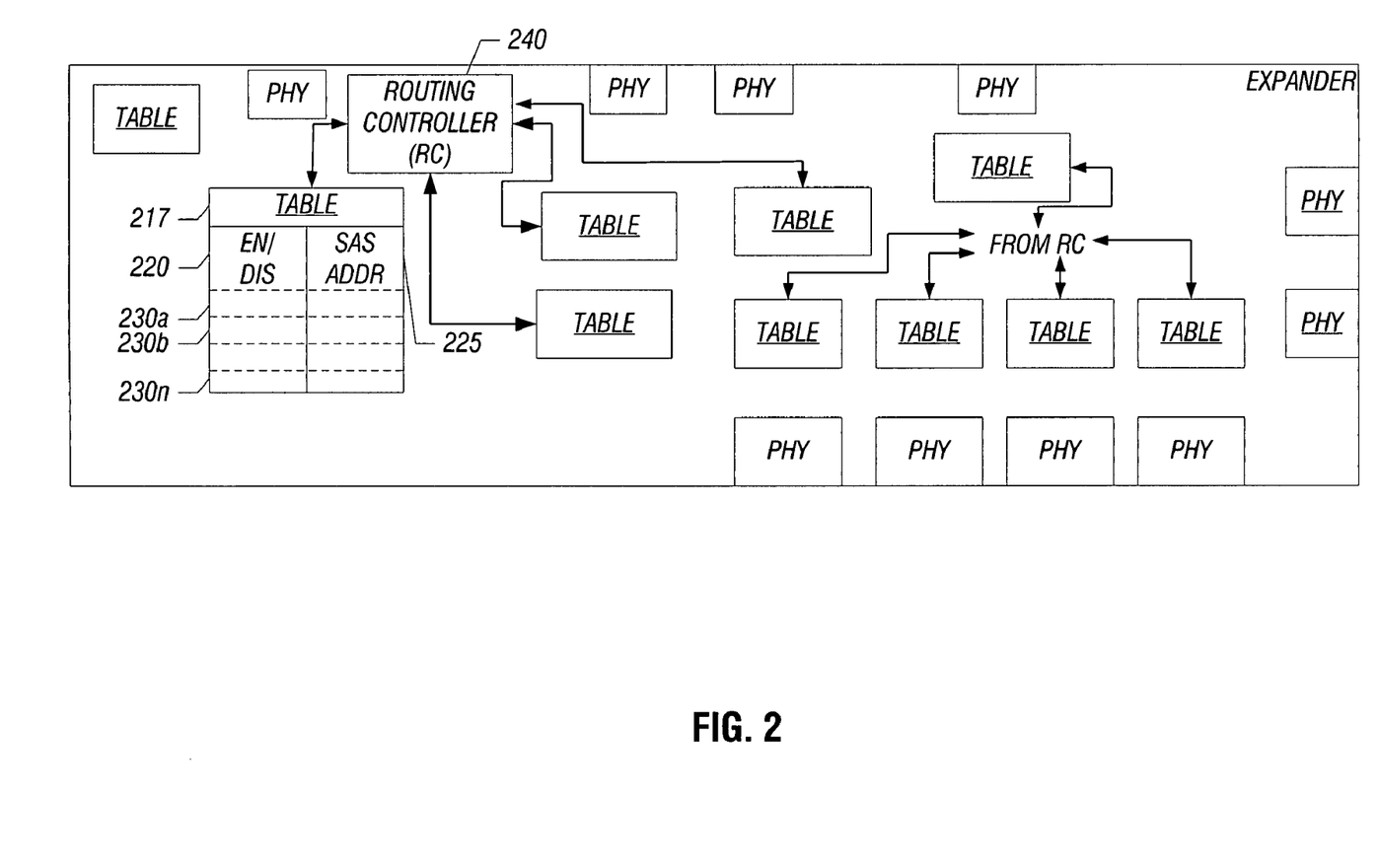
FIG. 2 is a block diagram of components of an expander according to an embodiment in a SAS domain in the computer system of FIG. 1.

Turning to FIG. 2, an example arrangement of the components of one of the expanders 110, 125, 130, and 135 in FIG. 1B are described in further detail. The expander includes storage to store routing tables (each labeled "TABLE") for respective phys (each labeled "PHY"). A routing table 217 for one of the phys includes expander route entries 230a, 230b, . . . , 230n, each of which may include an enable/disable bit 220 and a SAS address 225. A SAS address is a unique identifier assigned to an initiator, expander, or storage device. The routing table for each phy may include up to 12 route entries, according to one example implementation. A routing controller 240 in the expander 110 is able to access each routing table to allocate and remap the route entries in each of the routing tables as desired, as described further below.

Enable/disable bit 220 in a route entry indicates whether the route entry contains a valid SAS address. In some configurations, not all route entries in a routing table may be utilized. The enable/disable bit 220 for an un-utilized route table entry is set to the disable state.

Each phy in an expander has a routing attribute to indicate a routing capability of a phy. There are several types of routing attributes: direct routing attribute, subtractive routing attribute, and table routing attribute. A phy with the direct routing attribute indicates that the phy may be used to route a read/write request to an end device (e.g., a storage device or a host). A phy with the table routing attribute indicates that the phy may be used to route a read/write request using a routing table. A phy with the subtractive routing attribute indicates that the phy is used to route unresolved read/write requests (that is, requests not routed to a phy with a direct routing attribute or to a phy with a table routing attribute).

The routing attribute in combination with the type of device the phy is connected to indicate the routing method used by the phy. A phy with a direct routing attribute connected to an end device means that the direct routing method is used. A phy with the direct routing attribute that is connected to an expander also means that the direct routing method is used. The routing table for a phy connected by the direct routing method does not contain any valid route table entries and thus the enable/disable bit 220 is disabled for each route entry.

A phy with a subtractive routing attribute has the capability of functioning as an input phy in the expander (subtractive phys are upstream of table phys). A phy with the subtractive routing attribute connected to an expander means that the phy is connected according to the subtractive routing method. On the other hand, a phy with the subtractive routing attribute connected to an end device means that the phy is connected according to the direct routing method. The routing table for a phy connected according to the subtractive routing method does not contain any valid route table entries and thus the enable/disable bit 220 is disabled for each route entry.

A phy with a table routing attribute indicates that the phy can function as an interface to another expander. A phy with the table routing attribute connected to an expander means that the phy is connected according to the table routing method. However, a phy with the table routing attribute connected to an end device means that the phy is connected according to the direct routing method. The routing table for a phy connected according to the table routing method may include valid route entries used by the routing controller to route read/write requests and perform information transfers.

The table below summarizes the routing method used based on the phy attribute and type of device connected to the phy:

| Phy Attribute | Connected Device | Routing Method Used |
| --- | --- | --- |
| Direct | End Device | Direct |
| Direct | Expander | Direct |
| Subtractive | End Device | Direct |
| Subtractive | Expander | Subtractive |
| Table | End Device | Direct |
| Table | Expander | Table |

Figure 3:
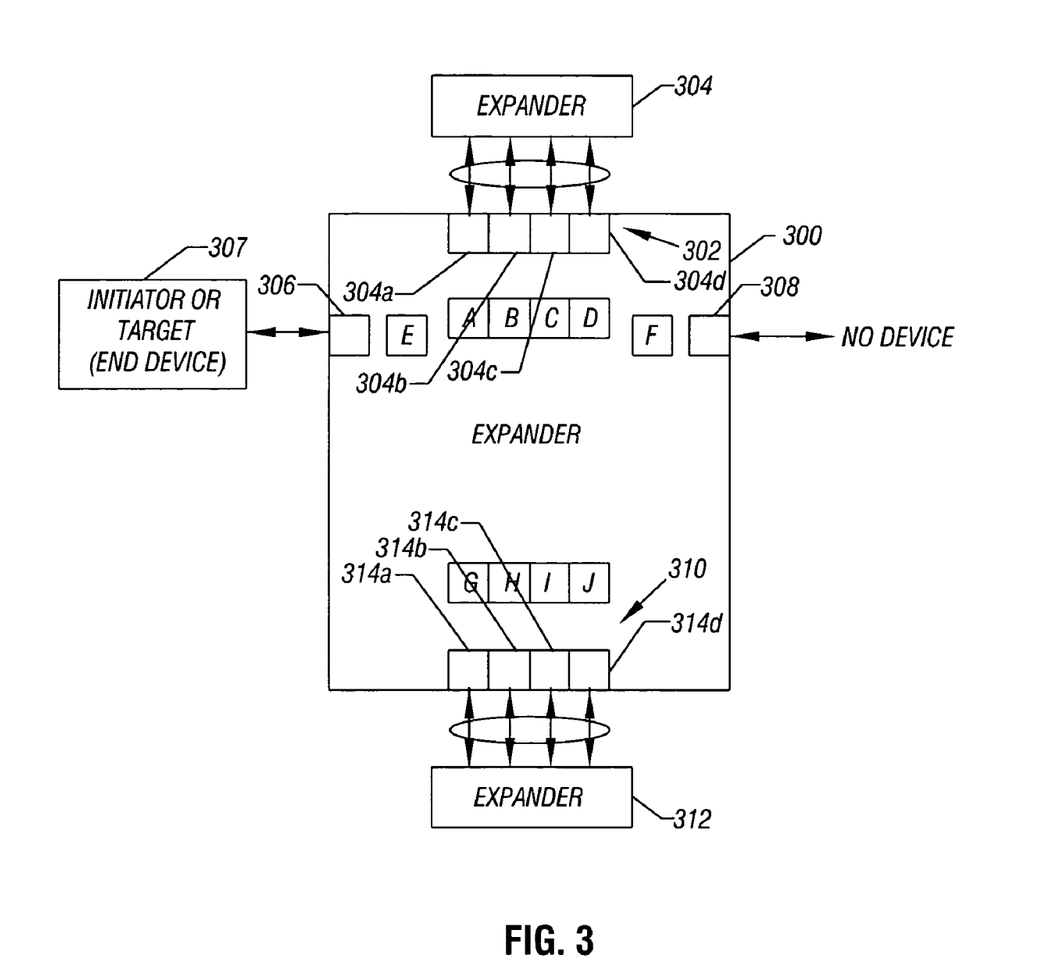
FIG. 3 is a schematic diagram of an example arrangement of an expander according to an embodiment containing multiple SAS phys that are associated with respective route table entries.

FIG. 3 illustrates an expander 300 (which can be any of one of the expanders 125, 130, and 135 shown in FIG. 1B) with unused and redundant route table entries. The expander 300 is connected over a wide port 302 to another expander 304. A port in an expander includes one or plural phys. A "wide port" includes plural phys. In the example shown, the wide port 302 includes four phys 304a–304d. The phys 304a–304d are connected according to the subtractive routing method, and thus route table entries (A, B, C, D) allocated to the respective subtractive routing phys 304a–304d are not used. Similarly, the port 306, which is directly connected to an end device 307 (initiator or target), is allocated route table entries (E) that are unused. Phy 308 is not connected to any device, and thus route table entries (F) allocated to the phy 308 are also unused.

The expander 300 is connected to another expander 312 through a wide port 310 having phys 314a–314d. The phys 314a–314d are connected according to the table routing method. However, since the phys 314a–314d are all part of the same wide port 310, the route table entries (G, H, I, J) for the phys 314a–314d, respectively, are redundant.

According to a current version of the SAS Standard, which implements static route table binding, the unused or redundant route table entries are not allocated to other phys, which reduces the number of SAS devices to which the expander can be connected. To increase the number of SAS devices that the expander 300 can be connected to, a dynamic route table binding scheme according to some embodiments of the invention is implemented that employs (1) remapping of unused route table entries from one port to another port(s), and (2) aliasing of redundant route table entries of a wide port so that each phy of the wide port uses the same route table entries, leaving the remaining route table entries for use by other port(s).

Figure 4:
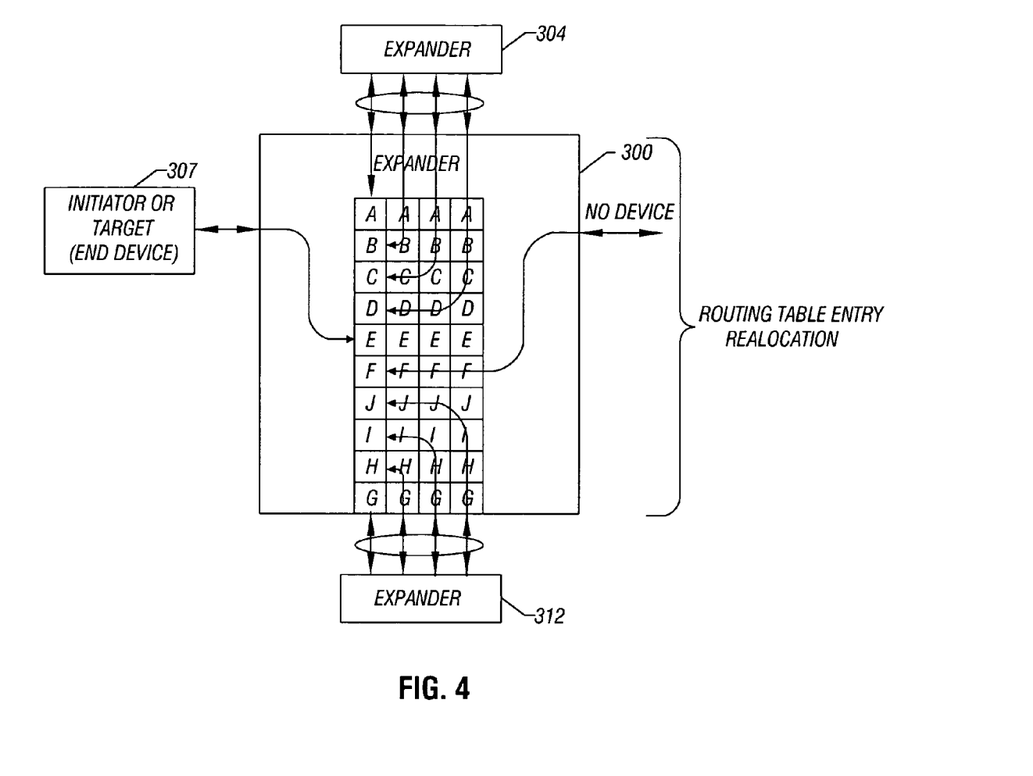
FIG. 4 illustrates mapping of unused and redundant route table entries of some of the SAS phys in the expander of FIG. 3 to other SAS phys in the expander, in accordance with an embodiment.

As shown in FIG. 4, after remapping has been performed, the following unused route table entries are remapped to the phy 314a in the wide port 310: route table entries A, B, C, D originally associated with respective subtractive routing phys 304a, 304b, 304c, 304d; the route table entries E originally associated with the direct routing port 306; and route table entries F originally associated with the unused port 308. Also, aliasing is performed to map the route table entries H, I, J (which would be redundant of G without aliasing) to the phy 314a. After the remapping and aliasing, route table entries A–J are all mapped to phy 314a. Note that the other phys 314b, 314c, 314d of the wide port 310 (FIG. 3) all use the same table entries A–J.

If the number of route table entries per phy is N, then the total number of route table entries that are available for each phy 314a–314d is 10×N, rather than the 4×N route table entries available to phys 314a–314d before remapping and aliasing. As a result, the number of SAS devices in the expander tree that the expander 300 supports is increased substantially.

Effectively, the route table entries of the expander make up a virtual route table (rather than plural route tables dedicated to respective phys). The entries of the virtual route table can be dynamically mapped to phys that actually use the route table entries. Thus, as explained above, unused route table entries of one phy are remapped to one or more other phys, and redundant route table entries are aliased such that plural phys of the same SAS port share the same set of route table entries to avoid such redundancy.

Figure 5:
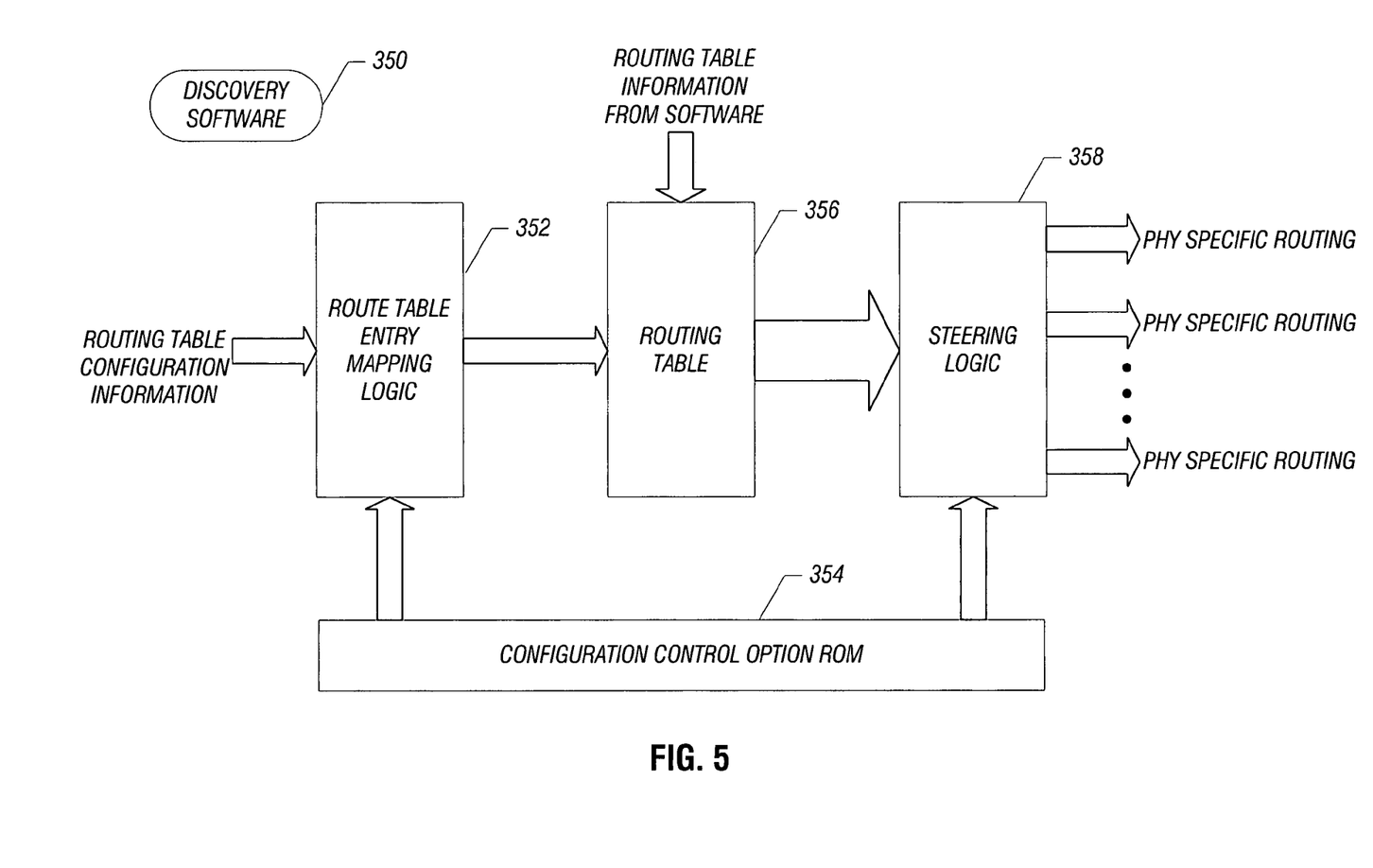
FIG. 5 is a block diagram of mapping logic according to an embodiment for mapping route table entries.

FIG. 5 depicts the logic in an expander used to perform remapping and aliasing according to some embodiments. In response to SMP (Serial Management Protocol) commands from discovery software 350 (executable in the computer system 107 of FIG. 1), a route table entry mapping (RTEM) logic 352 populates the route table entries in the expander 300 (FIGS. 3–4). SMP is the protocol used by SAS devices to communicate management information with other SAS devices in a SAS domain. The RTEM logic 352 is located in each expander in a SAS domain to enable remapping and aliasing of unused and redundant route table entries.

According to one embodiment, remapping of route table entries can be performed without modification of the discovery software 350. To perform the remapping and aliasing in this embodiment, the RTEM logic 352 accesses configuration control information stored in a non-volatile memory 354 (such as flash memory or electrically erasable and programmable read-only memory). The configuration control information can be pre-installed in the non-volatile memory 354 based upon the configuration of the SAS domain. A Routing Table SMP read/write request (for populating route table entries) from the discovery software 350 in the computer system is mapped by the RTEM logic 352 to route table entries 356 (which make up the virtual route table of the expander 300) based on the configuration control information in the non-volatile memory 354. The dynamic mapping or routing mechanism described above allows any number (zero or more) of route table entries to be assigned to a specific phy or a group of phys. The remapping or aliasing of route table entries 356 is determined by the content of the configuration control information stored in memory 354. In other words, the association of a route table entry with a particular phy is determined by the configuration control information.

In addition, steering logic 358 is used to ensure that the status due to an expander connection request is sent to the appropriate phy grant module or modules. A connection request is sent by an initiator to a target device to establish a connection between the initiator and the target device. A connection is established to enable the initiator to send commands, functions, and data to the target device. The target device specified in the connection request is matched to a route table entry in the route table 356. A match is indicated to the steering logic 358, which provides the routing status of the connection request to the appropriate one of the phys. The association of the matching route table entry to a given phy is based on the configuration control information stored in the memory 354. The routing status is sent to a grant module associated with the selected phy. Each phy is associated with a grant module to enable the phy to select one of multiple requests to process based on a predefined arbitration algorithm.

The mapping logic discussed above for performing remapping and aliasing can be performed by hardware, firmware, or software, or any combination of the above. Firmware and software are executable on a microcontroller, microprocessor, or other control unit. As used here, a "controller" refers to hardware, firmware, software, or a combination thereof. A "controller" can refer to a single component or to plural components (whether software, firmware, or hardware).

Data and instructions of the software and firmware are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the present invention has been described with respect to a limited number of embodiments, those skilled in the art will appreciate numerous modifications and variations there from. It is intended that the appended claims cover all such modifications and variations as fall within the true spirit and scope of this present invention.

What is claimed is:

1. A system comprising:
a first expander having plural interfaces to couple to at least one of a peripheral device, a controller, and another expander, the first expander having a storage to store entries containing routing information used to route a request received by the first expander to one of the interfaces, wherein each interface is allocated a respective set of the routing information entries; and mapping logic operable to remap unused routing information entries allocated to one of the interfaces to one or more other interfaces to expand capacity of the one or more other interfaces.

2. The system of claim 1, further comprising a port in the first expander, the port having at least two of the plural interfaces allocated respective sets of the routing information entries, the mapping logic operable to further map the routing information entries allocated to the at least two interfaces of the port such that each of the at least two interfaces of the port share the same routing information entries.

3. The system of claim 2, wherein the routing information entries of the at least two interfaces are redundant prior to mapping the routing information entries.

4. The system of claim 3, wherein the mapping logic is part of a dynamic route table mapping mechanism.

5. The system of claim 2, wherein the interfaces comprise serial attached small computer system interface (SAS) phys.

6. The system of claim 5, wherein the SAS phys comprise at least one SAS phy connected according to a direct routing method, at least one SAS phy connected according to a subtractive routing method, and at least one SAS phy connected according to a table routing method, wherein routing information entries of the SAS phys connected according to the direct routing and subtractive routing methods are unused, the mapping logic operable to remap the unused routing information entries of the SAS phys connected according to the direct routing method and subtractive routing method to the at least one SAS phy connected according to the table routing method.

7. The system of claim 6, wherein the routing information entries comprise route table entries.

8. The system of claim 1, further comprising non-volatile memory to store configuration information, the mapping logic operable to remap the routing information entries based on the configuration information.

9. The system of claim 8, further comprising discovery software executable to send commands to populate the routing information entries, wherein remapping is performed without discovery software control.

10. The system of claim 9, the mapping logic operable to map the commands from the discovery software to locations in storage containing the routing information entries.

11. The system of claim 1, further comprising one or more peripheral devices connected to the first expander.

12. The system of claim 11, wherein the one or more peripheral devices comprise one or more storage devices.

13. The system of claim 1, wherein remapping the routing information entries to the one or more other interfaces enables the one or more other interfaces to be coupled to more devices than without the remapping of the routing information entries to the one or more other interfaces.

14. The system of claim 1, wherein the first expander is adapted to couple to a first number of devices before the remapping, and the first expander is adapted to couple to a second number of devices after the remapping, the second number being greater than the first number.

15. The system of claim 1, wherein the mapping logic is part of the first expander.

16. The system of claim 1, further comprising:
a storage subsystem containing the expander;
a processor; and software executable on the processor to issue commands to the storage subsystem to access data stored in the storage subsystem.

17. An expander for use in a system having a peripheral device, a controller, and another expander, comprising:
plural interfaces to couple to at least one of the peripheral device, the controller, and the another expander;
a storage to store entries containing routing information used to route a request received by the expander to one of the interfaces, the interfaces being allocated respective sets of the routing information entries; and
mapping logic operable to remap unused routing information entries allocated to a first one of the interfaces to a second one of the interfaces.

18. The expander of claim 17, further comprising a port having at least two of the plural interfaces,
the mapping logic operable to further map the routing information entries such that each of the two interfaces of the port share the same routing information entries.

19. The expander of claim 18, wherein the routing information entries of the at least two interfaces are redundant prior to mapping the routing information entries.

20. The expander of claim 17, wherein the interfaces comprise serial attached small computer system interface (SAS) phys.

21. The expander of claim 20, wherein the SAS phys comprise at least one SAS phy connected according to a direct routing method, at least one SAS phy connected according to a subtractive routing method, and at least one SAS phy connected according to a table routing method, wherein routing information entries of the SAS phys connected according to the direct routing and subtractive routing methods are unused, the mapping logic operable to remap the unused routing information entries of the SAS phys connected according to the direct routing method and subtractive routing method to the at least one SAS phy connected according to the table routing method.

22. The expander of claim 17, further comprising non-volatile memory to store configuration information, the mapping logic operable to remap the routing information entries based on the configuration information.

23. The expander of claim 17, wherein the expander is adapted to couple to a first number of devices before the remapping, and the expander is adapted to couple to a second number of devices after the remapping,
the second number being greater than the first number.

24. A method for use in a system having a first expander containing plural interfaces to couple to at least a peripheral device, a controller, and another expander, comprising:
storing entries containing routing information used to route a request received by the first expander to one of the interfaces, wherein each interface is allocated a respective set of the routing information entries;
determining unused routing information entries allocated to a first one of the interfaces; and
remapping the unused routing information entries allocated to the first interface to a second one of the interfaces to enable the second interface to be coupled to additional devices.

25. The method of claim 24, further comprising:
determining unused routing information entries allocated to a third one of the interfaces; and
remapping the unused routing information entries allocated to the second interface.

26. The method of claim 24, wherein the first expander has a port, the port having at least two of the plural interfaces, the method further comprising:
mapping the routing information entries such that each of the two interfaces of the port share the same routing information entries.

27. The method of claim 26, wherein the routing information entries of the at least two interfaces are redundant prior to mapping the routing information entries.

28. The method of claim 24, wherein storing routing information entries for the interfaces comprises storing routing information entries for serial attached small computer system interface (SAS) phys.

29. The method of claim 28, wherein the SAS phys comprise at least one direct routing SAS phy, at least one subtractive routing SAS phy, and at least one table routing SAS phy,
wherein routing information entries of the direct routing and subtractive routing SAS phys are unused, and
wherein remapping the unused routing information entries comprises remapping the unused routing information entries of the direct routing and subtractive routing SAS phys to the table routing SAS phy.

30. The method of claim 24, further comprising storing configuration information, wherein remapping the unused routing information entries is based on the configuration information.

31. The method of claim 30, further comprising discovery software populating the routing information entries,
wherein remapping is performed without discovery software control.

32. The method of claim 24, wherein the first expander is adapted to couple to a first number of devices before the remapping, and the first expander is adapted to couple to a second number of devices after the remapping,
the second number being greater than the first number.

33. An apparatus comprising:
first expanding means having plural interfaces for coupling to at least one of a peripheral device, a controller, and another expanding means,
means for storing entries containing routing information used to route a request received by the first expanding means to one of the interfaces, wherein each interface is allocated a respective set of routing information entries; and
mapping means for remapping unused routing information entries allocated to a first one of the interfaces to a second one of the interfaces.

34. The system of claim 33, further comprising
means for determining unused routing information entries allocated to a first one of the interfaces.

35. The system of claim 34, further comprising:
means for determining unused routing information entries allocated to a third one of the interfaces; and
means for remapping the unused routing information entries allocated to the second interface.

36. The system of claim 33, wherein the interfaces comprise serial attached small computer system interface (SAS) phys.

37. An article comprising at least one storage medium containing instructions executable by an expander, the expander having plural interfaces to couple to devices, the expander storing entries containing routing information used to route a request received by the expander to one of the interfaces, wherein each interface is allocated a respective set of the routing information entries, the instructions when executed causing the expander to:
determine unused routing information entries allocated to a first one of the interfaces; and
remap the unused routing information entries allocated to the first interface to a second one of the interfaces to enable the second interface to be coupled to additional devices.

38. The article of claim 37, wherein remapping the unused routing information entries comprises remapping unused routing information entries allocated to a first serial attached small computer system interface (SAS) phy to a second SAS phy.

* * * * *